(12) United States Patent
Rho et al.

(10) Patent No.: US 11,176,207 B2
(45) Date of Patent: Nov. 16, 2021

(54) METHOD AND ELECTRONIC DEVICE FOR CLASSIFYING CONTENT

(71) Applicant: Samsung Electronics Co., Ltd., Suwon-si (KR)

(72) Inventors: Min-Jin Rho, Seoul (KR); Seung-A Lee, Suwon-si (KR); Min-Seok Han, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 48 days.

(21) Appl. No.: 16/470,750

(22) PCT Filed: Dec. 20, 2017

(86) PCT No.: PCT/KR2017/015091
§ 371 (c)(1),
(2) Date: Jun. 18, 2019

(87) PCT Pub. No.: WO2018/117628
PCT Pub. Date: Jun. 28, 2018

(65) Prior Publication Data
US 2019/0347293 A1 Nov. 14, 2019

(30) Foreign Application Priority Data
Dec. 20, 2016 (KR) .................. 10-2016-0175014

(51) Int. Cl.
*G06F 16/906* (2019.01)
*G06F 16/903* (2019.01)
*G06F 16/9038* (2019.01)
*G06F 16/185* (2019.01)

(52) U.S. Cl.
CPC .......... *G06F 16/906* (2019.01); *G06F 16/185* (2019.01); *G06F 16/9038* (2019.01); *G06F 16/90335* (2019.01)

(58) Field of Classification Search
CPC ............. G06F 16/906; G06F 16/90335; G06F 16/9038; G06F 16/185
See application file for complete search history.

(56) References Cited

U.S. PATENT DOCUMENTS 5,371,844 A * 12/1994 Andrew ................ G06F 3/0486
715/747
6,567,830 B1 * 5/2003 Madduri ............... G06F 40/169
715/235
7,185,274 B1 * 2/2007 Rubin ................... G06F 40/134
715/205
(Continued)

FOREIGN PATENT DOCUMENTS

KR 10-2008-0078431 A 8/2008
KR 10-2011-0059556 A 6/2011
(Continued)

*Primary Examiner* — Thu V Huynh
(74) *Attorney, Agent, or Firm* — Jefferson IP Law, LLP

(57) ABSTRACT

An electronic device that classifies and stores content is disclosed. In an electronic device, an electronic device is provided which comprises: a memory; a display; a memory; and a processor which is set to associate a first portion of the content displayed on the display with first color information in accordance with input from a user and to store the associated first portion in the memory.

6 Claims, 8 Drawing Sheets

(56) References Cited

U.S. PATENT DOCUMENTS

| | | | |
|---|---|---|---|
| 7,472,357 B1* | 12/2008 | Satterfield | G06F 3/048 |
| | | | 709/206 |
| 7,529,804 B1 | 5/2009 | Lu et al. | |
| 2004/0078757 A1* | 4/2004 | Golovchinsky | G06F 40/169 |
| | | | 715/205 |
| 2004/0143796 A1* | 7/2004 | Lerner | G06F 40/169 |
| | | | 715/234 |
| 2005/0144570 A1 | 6/2005 | Loverin et al. | |
| 2006/0036584 A1* | 2/2006 | Isa | G06F 3/0482 |
| 2007/0233692 A1* | 10/2007 | Lisa | G06F 16/9535 |
| 2010/0325527 A1* | 12/2010 | Estrada | G06F 40/169 |
| | | | 715/230 |
| 2011/0131487 A1 | 6/2011 | Nakajima | |
| 2012/0192233 A1* | 7/2012 | Wong | H04N 21/25891 |
| | | | 725/44 |
| 2013/0014054 A1 | 1/2013 | Choi et al. | |
| 2015/0058716 A1* | 2/2015 | Boothman | G06F 40/14 |
| | | | 715/254 |
| 2016/0034559 A1 | 2/2016 | Feyereisl et al. | |
| 2019/0294587 A1* | 9/2019 | Prakash | G06Q 10/107 |

FOREIGN PATENT DOCUMENTS

| | | |
|---|---|---|
| KR | 10-2013-0004654 A | 1/2013 |
| KR | 10-2015-0051655 A | 5/2015 |
| KR | 10-2016-0015838 A | 2/2016 |

* cited by examiner

METHOD AND ELECTRONIC DEVICE FOR CLASSIFYING CONTENT

CROSS-REFERENCE TO RELATED APPLICATION(S)

This application is a National Phase Entry of PCT International Application No. PCT/KR2017/015091, which was filed on Dec. 20, 2017, and claims priority to Korean Patent Applications No. 10-2016-0175014, which was filed in the Korean Intellectual Property Office on filed on Dec. 20, 2016, the entire disclosure of each of these applications is incorporated herein by reference.

TECHNICAL FIELD

The disclosure relates to a method for classifying and storing content on the basis of identification information.

BACKGROUND ART

Recent trends of providing various interfaces by electronic devices and providing various contents through wireless communication networks have been followed by gradual development of technologies for enabling users to collect and store only desired contents.

A user can extract only a necessary part of content displayed on the display of an electronic device by dragging the same, and can store the extracted content in the memory of the electronic device. The user can acquire and store desired content by repeatedly performing the above operation.

DETAILED DESCRIPTION OF THE INVENTION

Technical Problem

According to various embodiments of the disclosure, at least a part of content displayed by an electronic device may be classified with regard to a category.

An electronic device according to various embodiments of the disclosure may associate content with different identification information with regard to each category and store the content associated with the identification information in the memory, thereby enabling the user to classify and collect only necessary information.

An electronic device according to various embodiments of the disclosure may search for and extract pieces of information related to stored content by using an external server and store the same in the memory.

Technical Solution

There is provided an electronic device including: a memory; a display; a memory; and a processor configured to associate a first part of content displayed on the display with first color information according to an input from a user and to store the first part in the memory.

There is provided a non-temporary computer-readable recording medium having a program to be performed by a computer recorded therein, the program including commands which, when executed by a processor, cause the processor to perform: displaying multiple colors on a display according to an input of selecting a first part from content displayed on the display; receiving an input of information regarding a first color selected from the multiple colors; and associating a first part of content displayed on the display with the first color information and storing the first part in a memory.

A content classification method may include: displaying multiple colors on a display according to an input of selecting a first part from content displayed on the display; receiving an input of information regarding a first color selected from the multiple colors; and associating a first part of content displayed on the display with the first color information and storing the first part in a memory.

Advantageous Effects

According to various embodiments of the disclosure, an electronic device may enable a user to classify and collect directly-needed information only on the basis of the color and may generate folders distinguished by the color, thereby enabling the user to easily find and distinguish only subdivided information desired by him/her.

MODE FOR CARRYING OUT THE INVENTION

Figure 1:
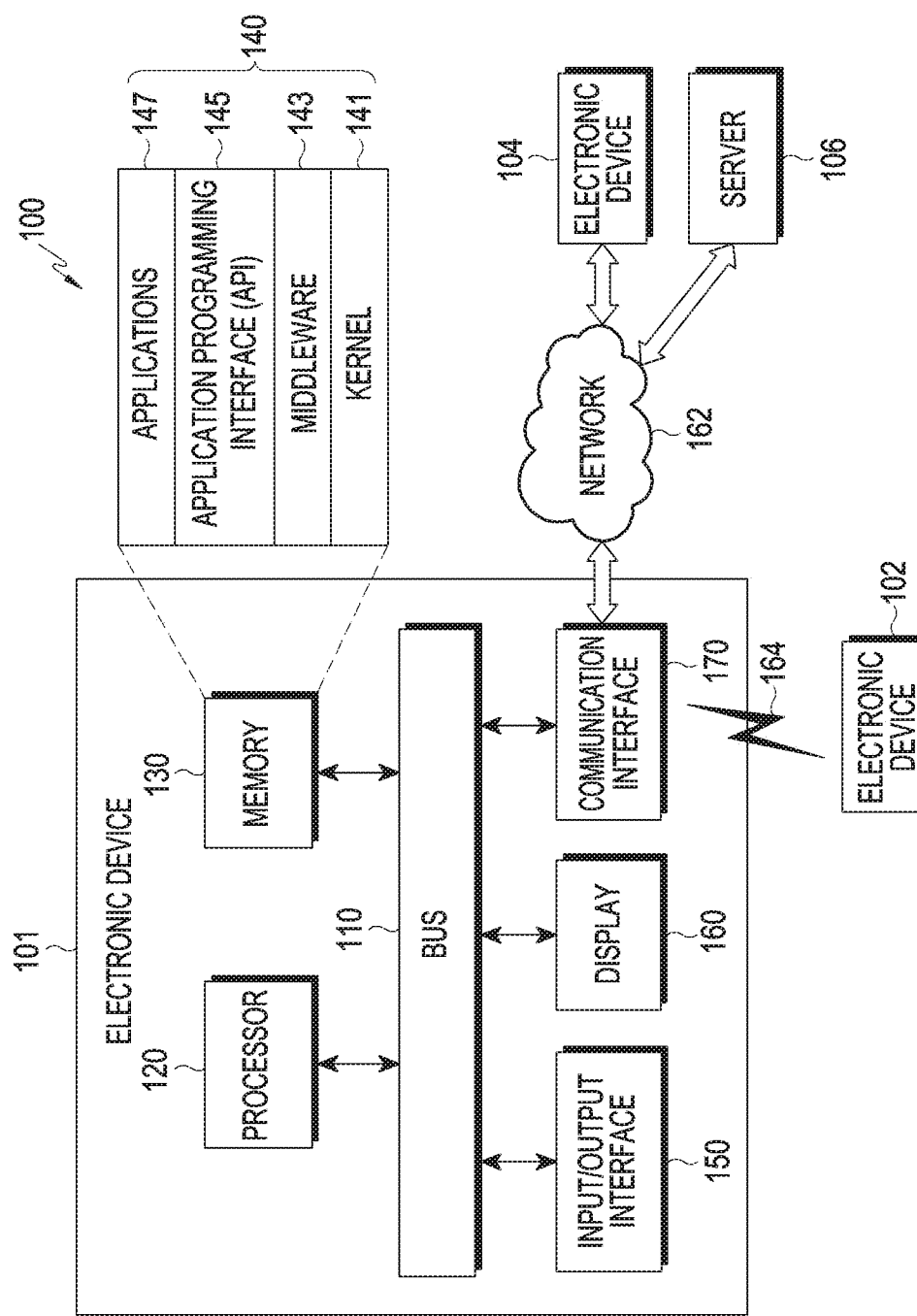
FIG. 1 illustrates a network environment including an electronic device according to various embodiments of the disclosure.

Hereinafter, various embodiments of the disclosure will be described with reference to the accompanying drawings. The embodiments and the terms used therein are not intended to limit the technology disclosed herein to specific forms, and should be understood to include various modifications, equivalents, and/or alternatives to the corresponding embodiments. In describing the drawings, similar reference numerals may be used to designate similar constituent elements. A singular expression may include a plural expression unless they are definitely different in a context. As used herein, the expression "A or B" or "at least one of A and/or B" may include all possible combinations of items enumerated together. The expression "a first", "a second", "the first", or "the second" may modify various components regardless of the order and/or the importance, and is used merely to distinguish one element from any other element without limiting the corresponding elements. When an element (e.g., first element) is referred to as being "(functionally or communicatively) connected," or "directly coupled" to another element (second element), the element may be connected directly to the another element or connected to the another element through yet another element (e.g., third element).

The expression "configured to" as used in various embodiments of the disclosure may be interchangeably used with, for example, "suitable for", "having the capacity to", "designed to", "adapted to", "made to", or "capable of" in terms of hardware or software, according to circumstances. Alternatively, in some situations, the expression "device configured to" may mean that the device, together with other devices or components, "is able to". For example, the phrase "processor adapted (or configured) to perform A, B, and C" may mean a dedicated processor (e.g., embedded processor) only for performing the corresponding operations or a generic-purpose processor (e.g., Central Processing Unit (CPU) or Application Processor (AP)) that can perform the corresponding operations by executing one or more software programs stored in a memory device.

An electronic device according to various embodiments of the disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), an MPEG-1 audio layer-3 (MP3) player, a mobile medical device, a camera, and a wearable device. According to various embodiments, the wearable device may include at least one of an accessory type (e.g., a watch, a ring, a bracelet, an anklet, a necklace, glasses, a contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit). In some embodiments, the electronic device may include at least one of, for example, a television, a Digital Video Disk (DVD) player, audio equipment, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

In other embodiments, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Device, an electronic device for a ship (e.g., a navigation device for a ship and a gyrocompass), avionics, security devices, an automotive head unit, a robot for home or industry, an Automatic Teller Machine (ATM) in banks, Point Of Sales (POS) in a shop, or internet device of things (e.g., a light bulb, various sensors, electric or gas meter, a sprinkler device, a fire alarm, a thermostat, a streetlamp, a toaster, sporting goods, a hot water tank, a heater, a boiler, etc.). According to some embodiments, an electronic device may include at least one of a part of furniture or a building/structure, an electronic board, an electronic signature receiving device, a projector, and various types of measuring instruments (e.g., a water meter, an electric meter, a gas meter, a radio wave meter, and the like). In various embodiments, the electronic device may be flexible, or may be a combination of one or more of the aforementioned various devices. The electronic device according to embodiments of the disclosure is not limited to the above-described devices. In the disclosure, the term "user" may indicate a person using an electronic device or a device (e.g., an artificial intelligence electronic device) using an electronic device.

Referring to FIG. 1, an electronic device 101 within a network environment 100 according to various embodiments will be described. The electronic device 101 may include a bus 110, a processor 120, a memory 130, an input/output interface 150, a display 160, and a communication interface 170. In some embodiments, the electronic device 101 may omit at least one of the elements, or may further include other elements. The bus 110 may include a circuit that interconnects the elements 110-170 and transmits communication (for example, control messages or data) between the elements. The processor 120 may include one or more of a central processing unit, an application processor, or a communication processor (CP). The processor 120, for example, may carry out operations or data processing relating to the control and/or communication of at least one other element of the electronic device 101.

The memory 130 may include volatile and/or non-volatile memories. The memory 130 may store, for example, commands or data relevant to at least one other element of the electronic device 101. According to an embodiment, the memory 130 may store software and/or a program 140. The program 140 may include, for example, a kernel 141, middleware 143, an application programing interface (API) 145, and/or an application program (also referred to as an "application") 147. At least some of the kernel 141, the middleware 143, and the API 145 may be referred to as an operating system. The kernel 141 may control or manage system resources (for example, the bus 110, the processor 120, or the memory 130) used for executing an operation or function implemented by other programs (for example, the middleware 143, the API 145, or the application 147). Furthermore, the kernel 141 may provide an interface through which the middleware 143, the API 145, or the application program 147 may access the individual elements of the electronic device 101 to control or manage the system resources.

The middleware 143 may function as, for example, an intermediary for allowing the API 145 or the application program 147 to communicate with the kernel 141 to exchange data. Furthermore, the middleware 143 may process one or more task requests, which are received from the application program 147, according to priorities thereof. For example, the middleware 143 may assign priorities for using the system resources (for example, the bus 110, the processor 120, the memory 130, or the like) of the electronic device 101 to at least one of the application programs 147, and may process the one or more task requests. The API 145 is an interface through which the applications 147 control functions provided from the kernel 141 or the middleware 143, and may include, for example, at least one interface or function (for example, instruction) for file control, window control, image processing, or text control. For example, the input/output interface 150 may forward commands or data, input from a user or another external device, to the other element(s) of the electronic device 101, or may output commands or data, received from the other element(s) of the electronic device 101, to the user or the external device.

The display 160 may include, for example, a Liquid Crystal Display (LCD), a Light Emitting Diode (LED) display, an Organic Light Emitting Diode (OLED) display, a Micro Electro Mechanical System (MEMS) display, or an electronic paper display. The display 160 may display, for example, various types of content (for example, texts, images, videos, icons, and/or symbols) to the user. The display 160 may include a touch screen and may receive, for example, a touch, gesture, proximity, or hovering input using an electronic pen or the user's body part. The communication interface 170 may establish, for example, communication between the electronic device 101 and an external device (for example, a first external electronic device 102, a second external electronic device 104, or a server 106). For example, the communication interface 170 may be connected to a network 162 through wireless or wired communication to communicate with the external device (for example, the second external electronic device 104 or the server 106).

The wireless communication may include, for example, a cellular communication that uses at least one of LTE, LTE-Advance (LTE-A), code division multiple access (CDMA), wideband CDMA (WCDMA), universal mobile telecommunications system (UNITS), wireless broadband (WiBro), global system for mobile communications (GSM), or the like. According to an embodiment, the wireless communication may include, for example, at least one of Wi-Fi (Wireless Fidelity), Bluetooth, Bluetooth low energy (BLE), ZigBee, near field communication (NFC), magnetic secure transmission, Radio Frequency (RF), and body area network (BAN). According to an embodiment, the wired communication may include GNSS. The GNSS may be, for example, a global positioning system (GPS), a global navigation satellite system (Glonass), a Beidou navigation satellite system (hereinafter, referred to as "Beidou"), or Galileo (the European global satellite-based navigation system). Hereinafter, in this document, the "GPS" may be interchangeably used with the "GNSS". The wired communication may include, for example, at least one of a Universal Serial Bus (USB), a High Definition Multimedia Interface (HDMI), Recommended Standard 232 (RS-232), power line communication, a Plain Old Telephone Service (POTS), and the like. The network 162 may include a telecommunications network, for example, at least one of a computer network (for example, a LAN or a WAN), the Internet, and a telephone network.

Each of the first and second external electronic devices 102 and 104 may be of the same or a different type from the electronic device 101. According to various embodiments, all or some of the operations executed in the electronic device 101 may be executed in another electronic device or a plurality of electronic devices (for example, the electronic devices 102 and 104 or the server 106). According to an embodiment, when the electronic device 101 has to perform some functions or services automatically or in response to a request, the electronic device 101 may make a request for performing at least some functions relating thereto to another device (for example, the electronic device 102 or 104 or the server 106) instead of performing the functions or services by itself or in addition. Another electronic device (for example, the electronic device 102 or 104, or the server 106) may execute the requested functions or the additional functions, and may deliver a result thereof to the electronic device 101. The electronic device 101 may provide the received result as it is, or may additionally process the received result to provide the requested functions or services. To this end, for example, cloud computing, distributed computing, or client-server computing technology may be used.

Figure 2:
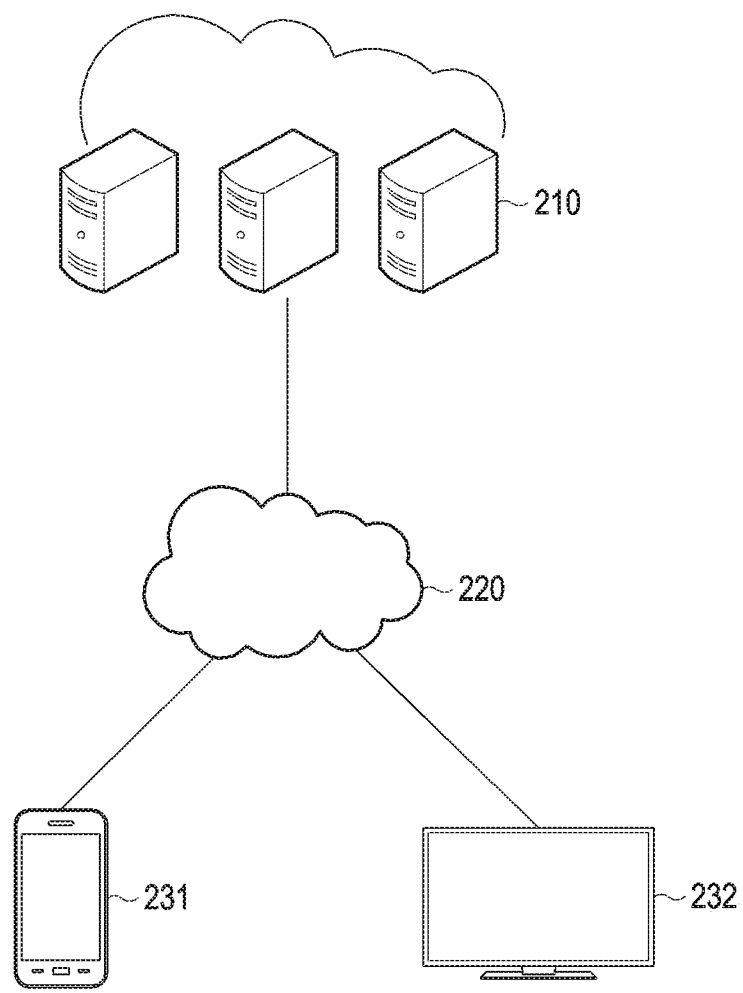
FIG. 2 is a diagram illustrating a configuration of connecting an electronic device according to various embodiments of the disclosure with a web server.

FIG. 2 is a diagram illustrating a configuration of connecting an electronic device according to another embodiment of the disclosure with an external server.

Electronic devices 231 and 232 according to various embodiments of the disclosure may be connected to an external server 210 through a network 220 by using a communication module. The network may have the same configuration as that of the network 162 described with reference to FIG. 1. The electronic devices 231 and 232 may refer to the mobile device 231 described with reference to FIG. 1, and may be configured to include a processor capable of performing various calculations and executing application programs, such as a personal computer 232. However, the electronic devices 231 and 232 illustrated in FIG. 2 are exemplary, and the type of electronic devices according to the disclosure is not limited thereto. The electronic devices 231 and 232 may receive various contents, such as texts, images, and moving images, from the external server 210 through the network 220. The user may need to select only content needed by the user from the vast amount of contents and to store the selected content in the memory. That is, the user may need to divide and store the selected contents with regard to each category, and configurations related to the category-specific content extraction scheme and the storing method will now be described in detail with reference to FIG. 3.

Figure 3:
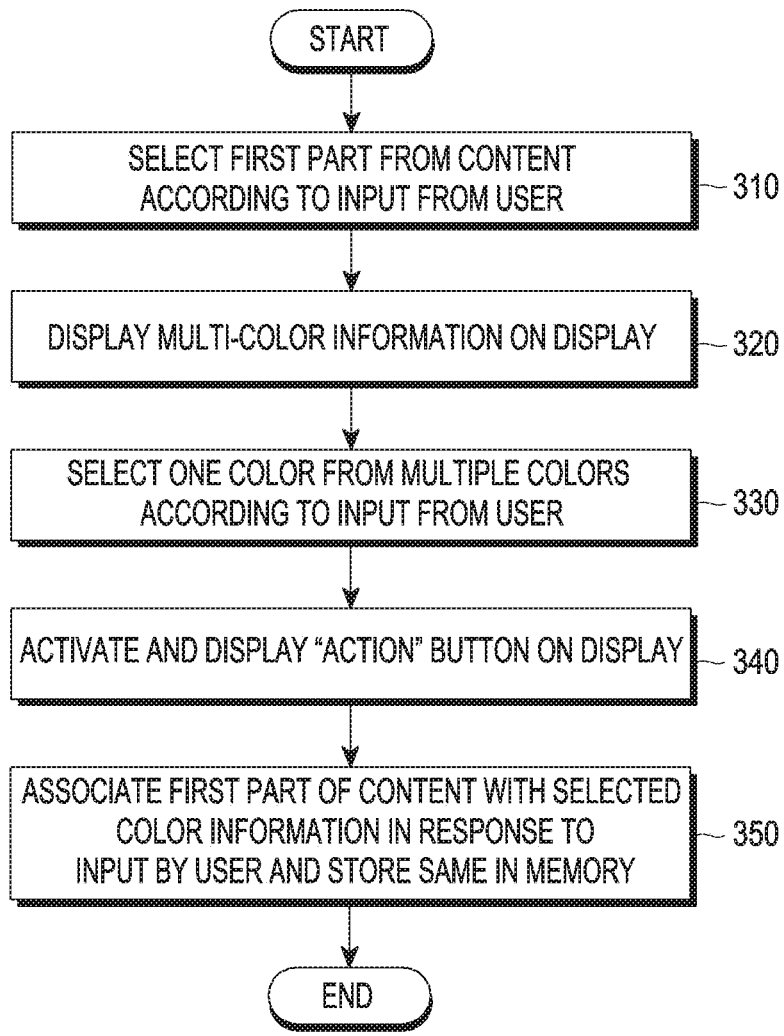
FIG. 3 is a flowchart illustrating a method for extracting and storing content in connection with an electronic device according to various embodiments of the disclosure.
Figure 4:
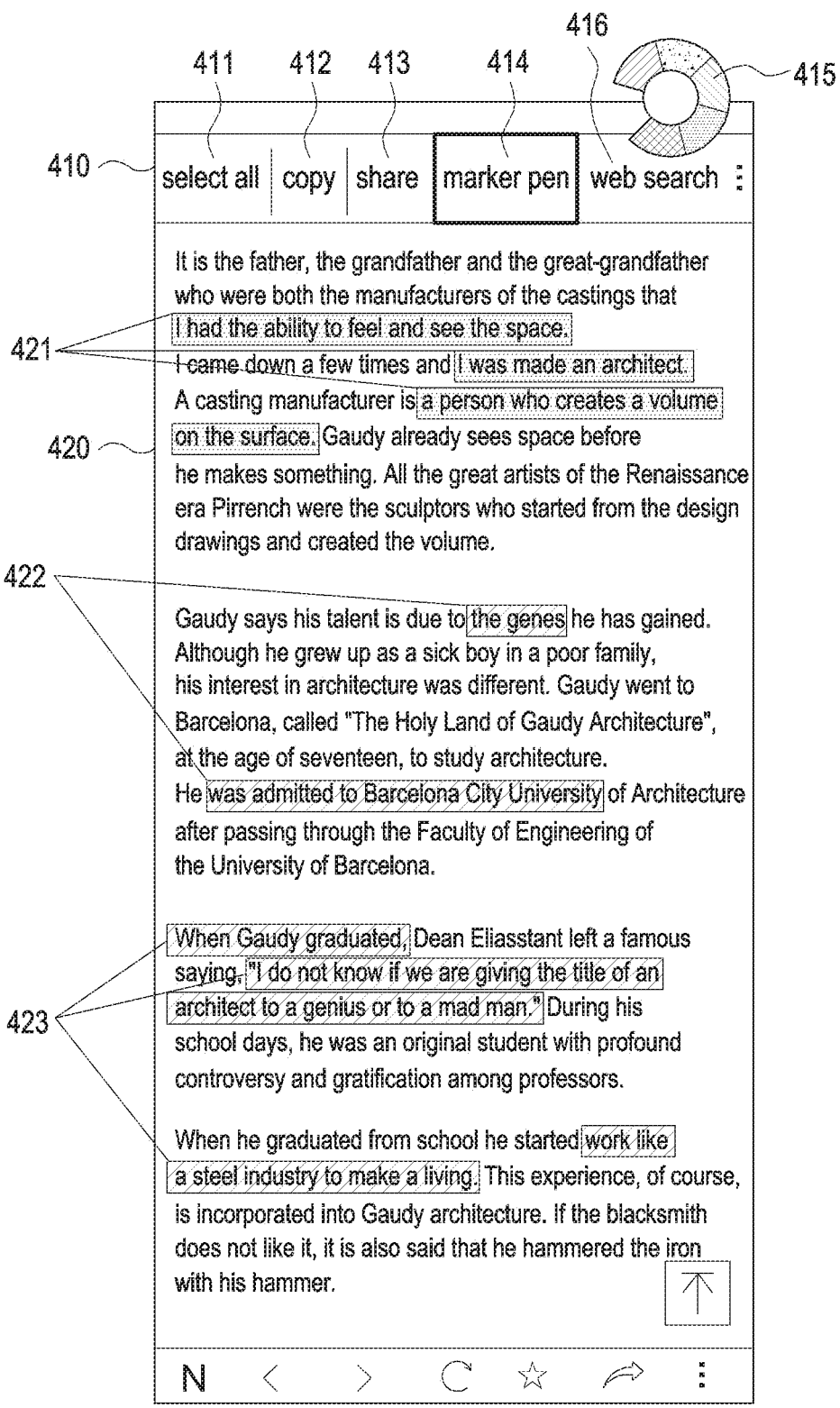
FIG. 4 is a diagram illustrating a configuration of extracting content in connection with an electronic device according to various embodiments of the disclosure.

FIG. 3 is a flowchart illustrating a method for extracting and storing content in connection with an electronic device according to various embodiments of the disclosure. FIG. 4 is a diagram illustrating a configuration of extracting content in connection with an electronic device according to various embodiments of the disclosure.

In operation 310, the processor may select a first part from content according to an input from the user. Referring to FIG. 4 for a detailed description, the processor 120 of the electronic device may separately display, through a display 160, a portion on which an interface 410 is displayed and a portion 420 on which content is displayed. The display 160 of the electronic device 100 may provide an interface 410 for providing various buttons such that the user can control contents in various types. The interface 410 may provide a "select all" button 411, a "copy" button 412, a "share" button 413, a "marker pen" button 414, a "web search" button 416, and the like, and may provide multi-color information 415 in some cases. If the user selects the "select all" button 411, all contents displayed on the screen may be selected; and, if the "copy" button 412 is selected, all content displayed on the screen or at least part of selected content may be stored in the memory in various types, such as a clipboard. If the user selects the "share" button 413, the user may share at least a part of content with external electronic devices by using a specific application. If the user selects the "marker pen" button 414 and selects a first part from content displayed on the screen, the processor 120 may receive an input that enables selection of the first part from the content. Moreover, if the "web search" button 416 is selected, the electronic device 100 may receive search information from an external server on the basis of information related to the extracted first part. Particulars regarding the search using an external server will be described in detail with reference to FIG. 6 and FIG. 7.

The processor 120 according to various embodiments of the disclosure may receive an input of selecting the first part of the content from the user. The input may be performed by using an input interface, and, in the case of an electronic device 100 such as a terminal 231, the input may be performed by a drag operation performed by the user on the display 160. In addition, in the case of an electronic device such as a personal computer 232, the input may be performed through a separate input interface.

After completing the operation of receiving an input of selecting the first part of the content from the user, the processor may display multi-color information on the display in operation 320. The multi-color information may be displayed on the display like the multi-color information 415 in FIG. 4, and the electronic device may receive the user's selection of one color. That is, the multiple colors correspond to a set of colors that the user wants to connect with the first part, and a color selected therefrom is connected to the first part. The operation of displaying multiple colors may be presented in the type of a popup screen on the display, and may be presented such that the user can make a selection as in the case of the multi-color information 415 described above with reference to FIG. 4. If multiple colors are displayed in the above-mentioned types, the user may select a first color regarding first color information, which is to be connected to the first part, from the multiple colors, and the selection may be performed through a touch screen or another type of input interface as described above. After the selection is completed, the first part 421 of the content may be highlighted with the first color and displayed on the display. In addition, after the selection is completed, the processor 120 may highlight the "action" button and display the same on the display in operation 340. If the user makes an input regarding the "action" button, the processor may associate the first part of the content with information regarding the selected color and store the same in the memory in operation 350. In this case, activation of the "action" button and input regarding the "action" button are not necessarily mandatory, and the processor 120, upon receiving first color information from the user, may automatically associate the first part of the content with the first color and store the same in the memory. The same operation as described above may be performed with regard to the second part 422 and the third part 423, and the second part 422 and the third part 423 may be associated with second color information and third color information selected by the user, displayed on the display, and stored in the memory, respectively. That is, according to various embodiments of the disclosure, the user may classify contents parts, which are to be extracted from content, with regard to each category or color and may map each classified category to color information such that respective content parts can be distinguished.

According to various embodiments of the disclosure, the processor may extract another part of the content, which is related to the first part of the selected content, from the content. For example, after selection of the first part 421 is completed, the processor 120 may select another part of the content, which is associated with the first part 421 but has not been selected by the user. Alternatively, the processor 120 may receive an additional input made by the user to select another part of the content, which is associated with the first part 421 but has not been selected by the user, thereby acquiring another part of the content. In this case, the processor 120 may store another part of the content, selected or received, in the memory and, in this case, the processor 120 may similarly associate another part of the content with first color information, store the same in the memory, and store the same in the first folder which is associated with the first color information. The above description may be identically applied to the second part 422 and the third part 423. More details related to content storage will be described in detail with reference to FIG. 5.

Figure 5:
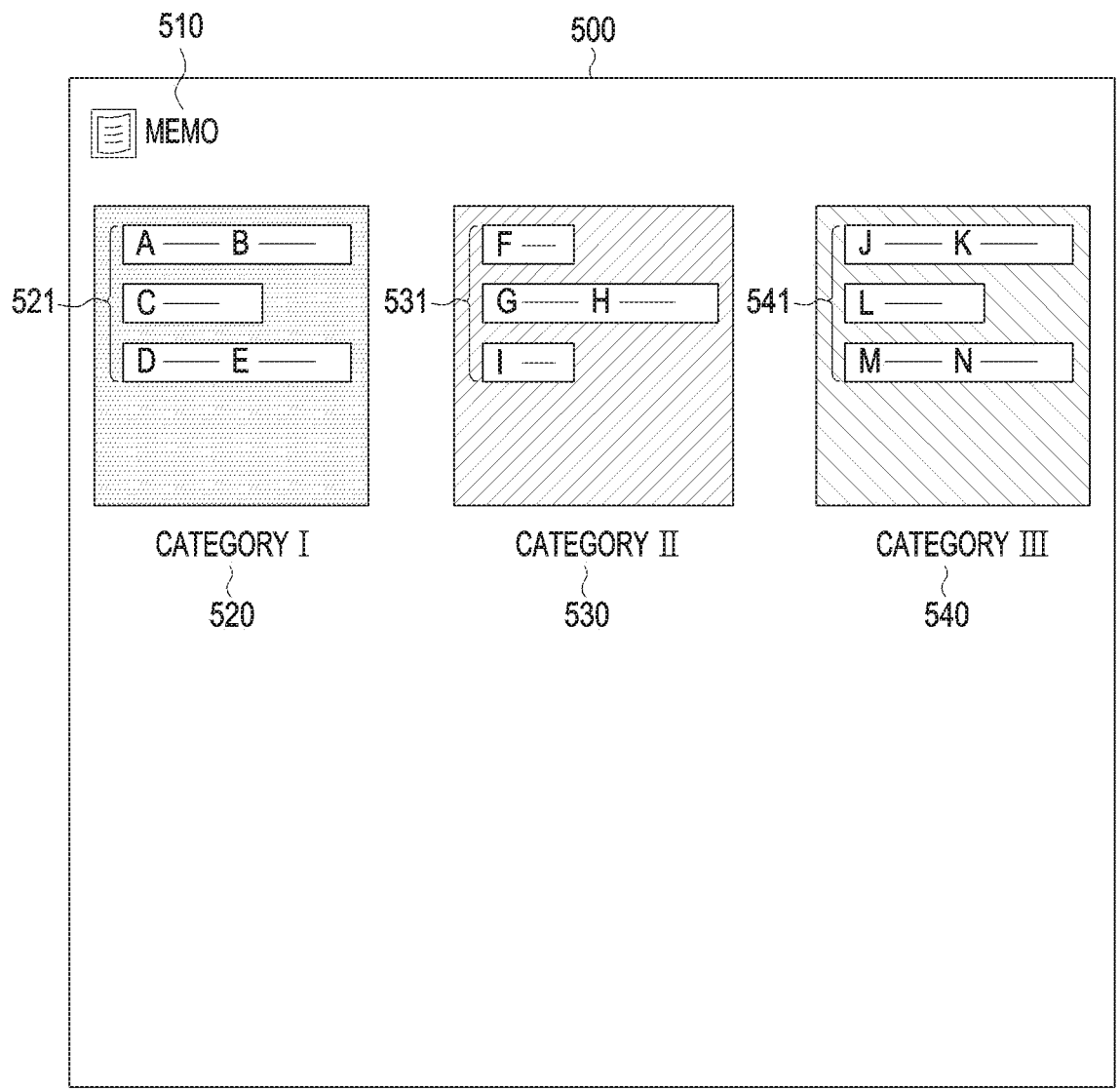
FIG. 5 is a diagram illustrating a configuration of storing content in a folder by an electronic device according to various embodiments of the disclosure.

FIG. 5 is a diagram illustrating a configuration of storing content in a folder by an electronic device 100 according to various embodiments of the disclosure.

As described above, respective parts selected from content by the user may be associated with respective pieces of selected color information and then stored. In this case, the processor 120 may generate a folder for each piece of color information such that respective parts of the content are stored in respective folders. Referring to FIG. 5, through the extraction process of FIG. 4, the first part 521 of the content, which corresponds to first color information, may be stored in the folder corresponding to category I 520, the second part 531 of the content, which corresponds to second color information, may be stored in the folder corresponding to category II 530, and the third part 541 of the content, which corresponds to third color information, may be stored in the folder corresponding to category III 540.

The processor according to various embodiments of the disclosure may conduct a control, if each part is stored in the folder related to each category, such that each part is displayed on the display 160. Specifically, referring to FIG. 5, when the memo 510 folder is opened, folders related to category I 520, category II 530, and category III 540 may be displayed on the display. When respective folders are displayed on the display 160, respective folders may be displayed on the basis of color information associated with respective folders. That is, if the processor 120 has stored content stored in the folder of category I 520 after associating the same with first color information in FIG. 4, the icon of the folder of category I 520 will have the first color as the background color. The above description may be identically applied to category II 530 and category III 540. According to various embodiments of the disclosure, in response to selection of the first part 521 from the content, the processor may generate a first folder corresponding to the first color and may display the first part 521 stored in the first folder on the icon of the first folder. When folders are displayed on the display, content parts stored in respective folders may be displayed on the icons of the folders. The above-mentioned configuration may enable the user to check content parts stored in the folders without opening the folders.

Figure 6:
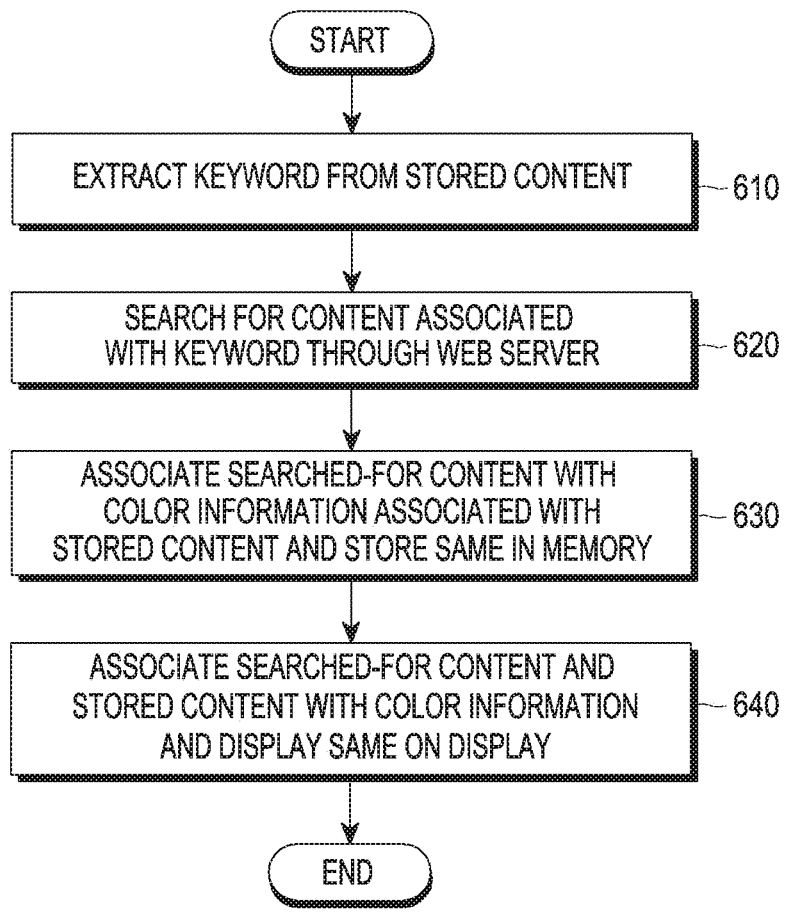
FIG. 6 is a flowchart illustrating a configuration of extracting and storing content in connection with an electronic device according to various embodiments of the disclosure.
Figure 7:
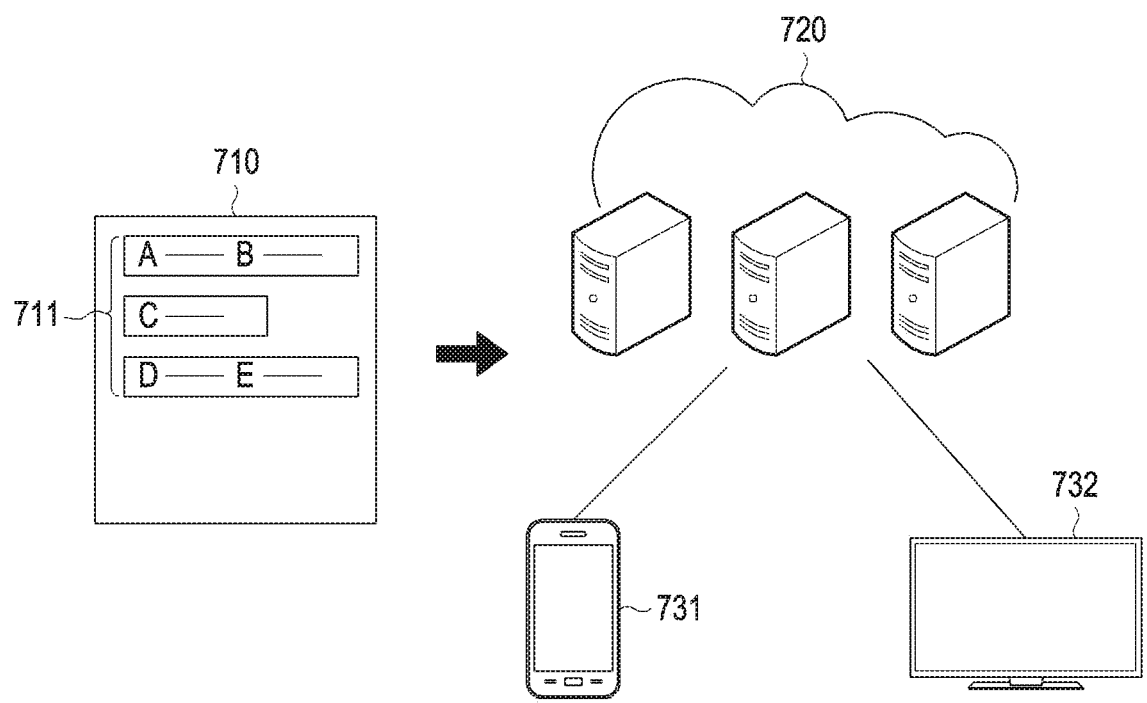
FIG. 7 is a flowchart illustrating a configuration of extracting and storing content by using an external server in connection with an electronic device according to various embodiments of the disclosure.

FIG. 6 is a flowchart illustrating a configuration of extracting and storing content in connection with an electronic device according to various embodiments of the disclosure. FIG. 7 is a flowchart illustrating an algorithm of extracting and storing content by using an external server in connection with an electronic device according to various embodiments of the disclosure.

In operation 610, the processor may extract a keyword from stored content. For example, in the case of category I 520 in FIG. 5, the processor may extract keywords such as "A", "B", "C", "D", and "E" from the first part 521 of the content. The processor may likewise extract "F", "G", "H", and "I" from the second part 531 of the content stored in category II 530, and may extract "J", "K", "L", "M", and "N" from the third part 541 of the content stored in category III 540. Referring to FIG. 7, the first folder 710 of FIG. 7 may contain the first part of the content, and the first part may include multiple keywords "A", "B", "C", "D", and "E". In this case, the processor may search, on the basis of an extracted keyword, for content associated with the keyword from the external server 720. The searched-for content may be anything that can be associated with the keyword, such as a link, a text, an image, and a moving image, and the searched-for content may be again provided to the electronic devices 731 and 732 and the like and stored in the memory. In this case, the processor 120 may store the searched-for content in the folder in which the keyword is stored, and the searched-for content may also be associated with color information and stored therein. That is, the processor according to various embodiments of the disclosure is capable of associating newly searched-for content with a part of already stored content and storing the same in the folder, and is capable of displaying the newly searched-for content together, through the display, on the icon of the stored folder as in FIG. 5.

Figure 8:
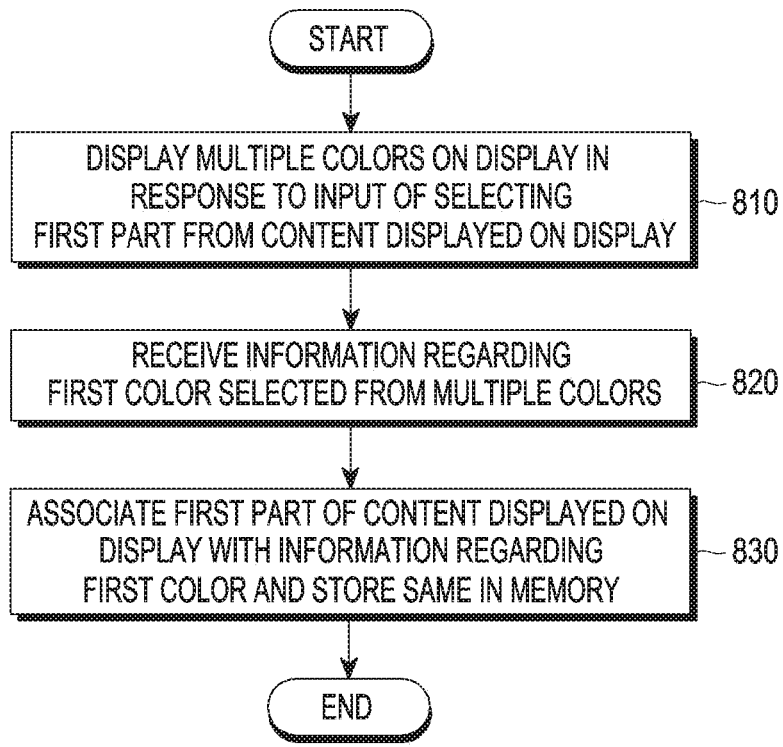
FIG. 8 is a flowchart illustrating a method of classifying content in connection with an electronic device according to various embodiments of the disclosure.

FIG. 8 is a flowchart illustrating a method of classifying content in connection with an electronic device according to various embodiments of the disclosure.

A non-temporary computer-readable recording medium according to various embodiments of the disclosure has a program recorded therein, which is to be performed by a computer. The program, when executed by a processor, may cause the processor to display multiple colors on the display according to an input of selecting a first part from content displayed on the display in operation 810. The processor may receive information regarding a first color selected from the multiple colors in operation 810. The processor may associate the first part of the content displayed on the display with the first color information and store the same in the memory in operation 810. The processor may receive search information regarding at least a part of the first part from an external server, associate the same with the first part, and store the same in the first folder. The processor may extract a keyword from the first part of the stored content and may search for the information through the external server by using the extracted keyword. The processor may further perform an operation of storing the first part in the first folder corresponding to the first color information. The processor may display multiple folders corresponding to multiple colors, respectively, on the display. The processor may further perform an operation of generating the first folder corresponding to the first color and displaying the same on the display in response to selection of the first part from the content. The processor may further perform an operation of extracting another part of the content, which is related to the selected first part of the content, from the content. The content may include at least one of a text, an image, and a moving image. In connection with the non-temporary computer-readable recording medium having a program recorded therein, which is to be performed by a computer, according to various embodiments of the disclosure, details regarding how the program is performed by the processor, when executed thereby, are identical to those performed by the processor in the electronic device, and repeated descriptions thereof will be omitted herein.

A content classification method according to various embodiments of the disclosure may include an operation of displaying multiple colors on the display in response to an input of selecting a first part from content displayed on the display. In addition, the method may include an operation of receiving information regarding a first color selected from the multiple colors. The method may include an operation of associating the first part of the content displayed on the display with the first color information and storing the same in the memory. The method may include an operation of receiving search information regarding at least a part of the first part from the external server, associating the same with the first part, and storing the same in the first folder. The method may include an operation of extracting a keyword from the first part of the stored content and searching for the information through the external server by using the extracted keyword. The method may further include an operation of storing the first part in the first folder corresponding to the first color information. The method may include an operation of displaying multiple folders corresponding to the multiple colors, respectively, on the display. The method may further include an operation of generating a first folder corresponding to the first color in response to selection of the first part from the content and displaying the same on the display. The method may further perform an operation of extracting another part of the content, which is related to the selected first part of the content, from the content. The content may include at least one of a text, an image, and a moving image. Details regarding the operations performed by the method according to various embodiments of the disclosure are identical to those performed by the processor in the electronic device, and repeated descriptions thereof will be omitted herein.

Various embodiments disclosed herein are provided merely to easily describe technical details of the disclosure and to help the understanding of the disclosure, and are not intended to limit the scope of the disclosure. Accordingly, the scope of the disclosure should be construed as including all modifications or various other embodiments based on the technical idea of the disclosure.

The invention claimed is:
1. An electronic device comprising:
a display;
a memory; and
at least one processor configured to:
control the display to display content including a plurality of texts, based on a first user input including a drag input on one or more texts among the plurality of texts, select a first part of the content, the first part including the one or more texts,
in response to selecting the first part of the content based on the drag input, control the display to display an object indicating a plurality of colors,
based on a second user input on the object, select a first color among the plurality of colors in a state in which the first part of the content is selected,
store the first part of the content in a first folder corresponding to the first color among a plurality of folders of the memory, wherein the plurality of folders respectively correspond to the plurality of colors,
receive search information regarding the first part of the content from an external server,
store the search information with the first part of the content in the first folder, and
after storing the first part of the content and the search information in the first folder, control the display to display an icon of the first folder, wherein the icon includes the first part of the content and the search information, and a background color of the icon of the first folder is the first color.

2. The electronic device of claim 1, wherein the at least one processor is further configured to:
extract a keyword from the stored first part of the content, and
search for the search information through a web server by using the extracted keyword.

3. The electronic device of claim 1, wherein the at least one processor is further configured to:

based on a third user input, select a second part of the content, the second part being different from the first part of the content, based on a fourth user input, select a second color among the plurality of colors in a state in which the second part of the content is selected, the second color being different from the first color, and store the second part of the content in a second folder corresponding to the second color among the plurality of folders.

4. A non-transitory computer-readable recording medium having a program recorded therein, the program comprising commands which, when executed by at least one processor of an electronic device, cause the at least one processor to:

control a display of the electronic device to display content including a plurality of texts, based on a first user input including a drag input on one or more texts among the plurality of texts, select a first part of the content, the first part including the one or more texts, in response to selecting the first part of the content based on the drag input, control the display to display an object indicating a plurality of colors, based on a second user input on the object, select a first color among a plurality of colors in a state in which the first part of the content is selected, store the first part of the content in a first folder corresponding to the first color among a plurality of folders of a memory of the electronic device, wherein the plurality of folders respectively correspond to the plurality of colors, receive search information regarding the first part of the content from an external server, store the search information with the first part of the content in the first folder, and after storing the first part of the content and the search information in the first folder, control the display to display an icon of the first folder, wherein the icon includes the first part of the content and the search information, and a background color of the icon of the first folder is the first color.

5. The non-transitory computer-readable recording medium of claim 4, wherein the commands which, when executed by the at least one processor of the electronic device, further cause the at least one processor to:

extract a keyword from the stored first part of the content, and search for the search information through the external server by using the extracted keyword.

6. The non-transitory computer-readable recording medium of claim 4, wherein the commands which, when executed by the at least one processor of the electronic device, further cause the at least one processor to:

based on a third user input, select a second part of the content, the second part being different from the first part of the content, based on a fourth user input, select a second color among the plurality of colors in a state in which the second part of the content is selected, the second color being different from the first color, and store the second part of the content in a second folder corresponding to the second color among the plurality of folders.

* * * * *